United States Patent
Duta

(10) Patent No.: US 6,455,085 B1
(45) Date of Patent: Sep. 24, 2002

(54) METHOD OF CONTROLLING THE OPERATION OF COOKING APPARATUS

(75) Inventor: Gheorghe Duta, Quinns Rock (AU)

(73) Assignee: VOS Industries Ltd., Western Australia (AU)

(*) Notice: Subject to any disclaimer, the term of this patent is extended or adjusted under 35 U.S.C. 154(b) by 0 days.

(21) Appl. No.: 09/462,332

(22) PCT Filed: Mar. 23, 1999

(86) PCT No.: PCT/AU99/00212

§ 371 (c)(1),
(2), (4) Date: Jan. 6, 2000

(87) PCT Pub. No.: WO99/48410

PCT Pub. Date: Sep. 30, 1999

(30) Foreign Application Priority Data

Mar. 24, 1998 (AU) .............................................. PP 2568
Jul. 14, 1998 (AU) .............................................. PP 4631

(51) Int. Cl.$^7$ .............................. A23L 1/00; G01N 33/00
(52) U.S. Cl. ...................................... 426/233; 426/523
(58) Field of Search ................................ 426/231, 233, 426/438, 523; 99/326, 330, 331, 336, 404, 408; 210/DIG. 8

(56) References Cited

U.S. PATENT DOCUMENTS

| 4,366,749 A | 1/1983 | Caridis et al. ................. 99/339 |
| 4,622,231 A | 11/1986 | Swartley ..................... 426/438 |
| 4,623,544 A * | 11/1986 | Highnote .................... 426/233 |
| 4,796,523 A | 1/1989 | Mette .......................... 99/470 |
| 4,942,808 A * | 7/1990 | Benson et al. ................ 99/404 |
| 5,066,505 A * | 11/1991 | Vos et al. ..................... 99/330 |
| 5,699,722 A | 12/1997 | Erickson et al. .............. 99/330 |
| 5,839,355 A | 11/1998 | Faulkner ....................... 99/330 |

FOREIGN PATENT DOCUMENTS

| AU | 26906/77 | 1/1979 |
| AU | 20460/92 | 2/1993 |
| WO | WO 83/03043 | 9/1983 |
| WO | WO 96/36266 | 11/1996 |

* cited by examiner

Primary Examiner—George C. Yeung
(74) Attorney, Agent, or Firm—Westman, Champlin & Kelly, P.A.

(57) ABSTRACT

Disclosed is a method of at least partially cooking food items by exposing them to a heated liquid cooking medium supplied by a cooking medium delivery pump and piping to a cooking zone of a cooker including a control unit which, during a cooking process; (a) controls the temperature of the cooking medium delivered to the cooking zone to a predetermined setpoint specific for the food items by controlling heat output from a heat exchanger for heating cooking medium throughout the cooking process; (b) controls the rate of convective heat transfer to the food items by directly controlling a sensed condition of cooking medium delivered to the cooking zone, other than temperature which is controlled in step (a), related to the rate of convective heat transfer; and, optionally, (c) controls the rate of convective heat transfer to the food items by controlling a sensed condition of the cooking zone related to the rate of convective heat transfer. Cookers which implement the method are also described.

17 Claims, 5 Drawing Sheets

METHOD OF CONTROLLING THE OPERATION OF COOKING APPARATUS

FIELD OF THE INVENTION

This invention relates to a method of control of cooking apparatus, and in particular to control over the heat transfer rate to food products being cooked in a particular cooking apparatus such as frying apparatus. Cooking apparatus for implementing the method is also disclosed.

BACKGROUND ART

Cooking apparatus cooks food items by exposing such to a heated liquid cooking medium such as an oil, gas or molten solid fat. The liquid may be oleaginous or aqueous depending on the nature of the cooking process, whether boiling or frying. Gaseous media may include steam or heated air or other gases. Conventionally, the cooking process -achieved by transfer of heat to the food material - is controlled by controlling two variables, the temperature of the cooking medium; and the time for which food items are exposed to the cooking medium.

A number of problems may arise with this form of control in practice. For example, while temperature may be controlled it has generally been controlled in a somewhat imprecise way, the temperature being that guessed by the operator to be the optimum for the cooking process on the basis of minimal temperature data. A similar imprecision applies to the cooking duration. The duration may be approximately correct but not optimum. Then, a still further level of complexity and lack of precision may result where there is no single cooking temperature that is applicable throughout the entire cooking process but rather the temperature should be a function of time, that is, changing throughout the cooking process. By way of example might be mentioned the cooking of a meat item where it may be desired to seal the outside of the item at high temperature at the commencement of the cooking process, the temperature then being varied downward to a value which is then maintained for the remainder of the cooking process.

Further variability in cooking temperature may result from temperature variations caused, for example, by loading of frozen food items into the cooking chamber or cooking zone during the cooking process. The loading operation will cause temperature drop on contact of frozen items with heated cooking medium. This problem that requires to be addressed.

A vat frying application, as commonly used in the quick-service food industry, is one employing the principle of deep frying of food items by immersing them in a body of heated cooking medium. Deep frying is a process of significant concern to the Applicant. In that case, a difficulty arises that is largely accepted in conventional practice, that is control over the temperature at one specific location within the body of cooking medium. This is a compromised system in which local overheating and underheating may take place, not only compromising the efficiency and quality of the cooking process and the food items that result from it but also leading to problems with the operation of the equipment itself. Even if temperature control is attempted, thermal inertia of the cooking medium filled vat results in poor control response and unbalanced temperature profile.

If there is local overheating of cooking medium, food items may be overcooked or may be non-uniformly cooked. If temperature is high local to a heating element, food particles and crumbs in this location may carbonise causing a cleaning and cooking medium quality problem. The cooking medium may degrade, product texture may be adversely affected or the oil uptake into the product may be increased. The latter situation may be undesirable where oily food product quality is desired to be avoided. Overheating may be a particular problem where carbonised food particles deposit in the pipes conveying the cooking medium within a given cooking apparatus.

In vat fryers, complete dismantling, cleaning or replacement of the pipes might be required every three to five years or even less depending on the capacity and usage of the cooking apparatus. In any event, any deposition of "scale" will interfere with the efficiency of heating of the cooking medium by a heat exchanger and may be compensated for by techniques that may actually exacerbate the overheating problem, for example heating of the heat exchange element or heating medium to higher temperatures where overheating becomes even more likely.

Previous practice has aimed at addressing such problems by mechanical design measures such as scrapers and augers for removal of crumb deposits. Oil removal devices may also be required. For example, vats may be equipped with cross flow arrangements aimed at causing mixing of the cooking medium and a more uniform heating. Cold zones might be provided in regions where crumbs are likely to deposit such that the temperature is maintained below the carbonisation temperature. Steam purging might also be employed in an effort to prevent carbonisation but this technique is potentially dangerous. In addition, filtration systems such as drum filters, belt filters (with paper or cloth belts) or other complex filtration systems may be installed. Drum and belt filters which expose oil to air are undesirable.

SUMMARY OF THE INVENTION

It is the object of achieving better control over the cooking process by reducing the above problems with the minimum resort to complex mechanical arrangements that forms the basis of this invention.

With this object in view, the present invention provides a method of at least partially cooking food items by exposing them to a heated liquid cooking medium supplied by cooking medium delivery means to a cooking zone of a cooker including a control unit which, during a cooking process;

(a) controls the temperature of the cooking medium delivered to the cooking zone to a pre-determined setpoint specific for the food items by controlling heat output from a heat exchanger for heating cooking medium throughout the cooking process;

(b) controls the rate of convective heat transfer to the food items by directly controlling a sensed condition of cooking medium delivered to the cooking zone, other than temperature which is controlled in step (a), related to the rate of convective heat transfer; and, optionally, (c) controls the rate of convective heat transfer to the food items by controlling a sensed condition of the cooking zone related to the rate of convective heat transfer.

Temperature control may be achieved throughout the cooking process by appropriately heating the cooking medium to a pre-determined setpoint for the cooking process using suitable heat exchangers which are operated bearing in mind the particular nature of the cooking medium being heated. For example, in the case of frying, where the cooking medium is an oil or molten fat, heating is desirably conducted in the absence of air using, for example, the flow heater arrangements as described in our Australian Patent No. 666944; and co-pending International Patent Application No. PCT/AU98/00552, filed 16th Jul., 1998, the contents of which are hereby incorporated herein by reference. Such heat exchangers may include a cooking medium cooling sub-system. Temperature may be varied as desired throughout the cooking process by suitable control over heat exchange element output.

The control over the rate of transfer of heat from cooking medium to food item may be achieved in a number of different ways. In establishing this control, the applicant has recognised that the cooking process commonly proceeds by a convective heat transfer mechanism rather than a conductive heat transfer mechanism. The thermal conductivity of cooking media such as oils and fats is quite low. Indeed oils and fats are insulators which only poorly conduct heat to food items being cooked.

Mechanisms of convective heat transfer rate control predicated on this understanding, must advantageously take into account the cooking process, the nature of food items to be cooked, such mechanisms may include the induction of turbulence in the cooking, medium especially local to a food item being cooked or, particularly desirably, control over the pressure or rate of flow of cooking medium delivered to the cooking zone or speed of flow of cooking medium past the food item. Such control may particularly advantageously be achieved independently of the control over cooking medium temperature and cooking duration, the latter of which is also controlled.

More specifically, said sensed condition of cooking medium delivered to the cooking zone is one or more of the following: cooking medium delivery pressure, cooking medium flowrate, cooking medium density, cooking medium viscosity and cooking medium turbulence; and, where step (c) is employed, one or more of the following: sprayer type, nozzle type, hydraulic restriction type, turbulence in the cooking zone, cooking zone temperature, cooking duration and basket shaking frequency.

Such control may be applied throughout the cooking process in the cases of various different cooking apparatus types. Indicative of the types of cooking apparatus that may be controlled in accordance with the method are spray cooking apparatus, vat type cooking apparatus and pressure fryers. Blanching apparatus may also be controlled in this way. The method may be applied to other kinds of cooking apparatus operating on the basis of cooking processes in which a convective heat transfer mechanism is of importance. Most cooking processes would fall into this category.

In the case where the cooking apparatus is a spray cooking apparatus, for example a spray fryer, the cooking medium flow rate through the sprayer nozzles into the cooking chamber may be controllably varied as may the cooking medium delivery pressure. Such sprayer nozzles may be of different type in terms of flow distribution and operating pressure range.

In the case where the cooking apparatus is a vat cooking apparatus, for example a vat fryer, turbulence or speed of flow of cooking medium past the surfaces of the food item while being cooked and energy transfer rate may be controllably varied. Generally, increasing speed or flow results in higher convective heat transfer. In this case, the sprayer nozzles may be replaced by hydraulic, such as flow or pressure, restrictions within the cooking medium delivery means to the vat. Such restrictions, like sprayers and nozzles, may have different characteristics such as pressure head and so on. The diaphragms, for example, may be employed in vat arrangements including crossflow arrangements for fine tuning of cooking medium flow which may be varied through the vat during the cooking process, to ensure substantially uniform temperature profile therein.

Cooking apparatus may be of multiple zone nature where the apparatus is configured to allow different cooking methodologies for food items progressing through the cooking zones through the generic cooking mechanism, for example spray or vat frying, may be the same for each cooking zone. This takes account of the fact that cooking processes often change in nature during the optimum cooking of some food items. Energy and temperature profile across the constituent cooking zones may be controlled to achieve this object. A common example applicable to meat is initial searing followed by slower cooking. Another food item type which undergoes different regimes during optimum cooking is potato crisps.

Advantageously, energy absorbed by the food items during the cooking process may be measured and used as a further basis for controlling the operation of cooking apparatus. In particular, such measurement may advantageously be used as a basis for controlling the rate of transfer of heat to the food items during the cooking process.

The measurement of energy absorbed by food items may be determined on the basis of the temperature differential between cooking medium temperature entering the or each cooking zone and cooking medium temperature leaving the or each cooking zone. This temperature differential may be multiplied by the mass flowrate of cooking medium and by the specific heat of the cooking medium. Allowance may also be made for heat losses from the cooking zone.

If the temperature differential falls outside predetermined limits, then corrective action may be taken to bring the temperature differential and the energy absorbed by the food items in the or each cooking zone within the desired limits.

Corrective action may be taken firstly by altering the flowrate of cooking medium, thus to decrease the error between the desired energy absorption of the food items and that actually achieved. An alarm condition may also be indicated at the same time.

Less preferably, as the cooking medium is heated in a heat exchanger to the desired temperature, temperature of the input cooking medium to the cooking zone may be varied in order to decrease the error between the desired energy absorption of the food items and that actually achieved. This is a more compromised control response because the increase of temperature of the cooking medium may have disadvantageous effects on the cooking medium quality.

The cooking duration, a sensed condition of the cooking zone like turbulence, may also be varied by, for example, controlling the speed of conveyor means or food product delivery or transfer means as a possible control response. The control responses are not exclusive. In addition, those described may be utilised in any combination.

The control strategy may be used to check for blockage of nozzles and other devices for delivery of liquid cooking medium to the cooking zone. When nozzles block, the temperature differential varies from normal conditions. The temperature differential could be measured between three temperature conditions of the cooking media: temperature of the liquid delivered to the cooking zone; temperature of the liquid in the cooking zone; and temperature of liquid leaving the cooking zone. As a result energy absorbed by food items may fall and food quality itself may vary since there no longer occurs a desired spraying or distribution of cooking medium into the cooking zone(s) of a cooker.

The control strategy is advantageously implemented by an electronic control unit used for the overall control over the operations of the cooking apparatus. It is most advantageous and desirable that the method be fully automated to achieve the best possible efficiencies of cooking. In particular, the control unit implements desired temperature, cooking medium flow and heat transfer rate control.

The control unit may be programmed with target or setpoint cooking medium temperature differentials specific to a given cooking process. The temperature differential setpoints may be programmed as a function of time, cooking medium flow rate, food item nature, food item throughput and/or other variables.

In a second aspect of the invention, relating to a most preferred cooking apparatus, there is provided a cooking apparatus including a cooking zone; cooking medium delivery means for delivering cooking medium to the cooking zone; cooking medium removal means for removing cooking medium from the cooking zone; and cooking medium conditioning means for conditioning removed and fresh cooking medium for delivery to the cooking zone wherein the means includes in sequence, pump means; filtration means and heat exchange means to which at least a portion of the cooking medium being conditioned successively passes.

The pump means, filtration means and heat exchange means, which may take the form of modules containing any desired number of pump, filtration and heat exchange units may be arranged in series or parallel as desired.

The pump means is particularly advantageously a variable speed centrifugal pump. The filtration after pumping, pressure filtration, contrasts with previous practice which required on the suction side of the pump a large filter area comprising a coarse primary filtration prior to pumping to protect the pump means and a fine secondary filtration following pumping and prior to heat exchange. Single stage filtration after pumping may be employed in accordance with the present invention reducing the filter area and allowing achievement of a more compact system.

The speed of the pump may be controlled having regard to pressure sensed in the cooking medium delivery means to the cooking zone, that is prior to the flow, pressure or hydraulic restrictors, sprayers or inlet nozzles depending upon the nature of the cooking apparatus. The centrifugal pump is particularly suited for this application because impeller speed can be varied to maintain the cooking medium flowrate as filter pressure rises without deterioration in the cooking medium quality, especially where the cooking medium is an oxidisable or otherwise degradable medium such as a fat or oil. In fact, the Applicant has measured no substantial deterioration in oil quality at pressures up to 5 bar. The cooking medium flowrate may be maintained substantially constant or varied for any or all cooking zones to achieve the object of controlled heat transfer rate to food items. Temperature of the cooking medium is likewise controlled, for example, by controlling the heat exchange element output or heating medium of the heat exchanger to achieve the optimum temperature or temperature range for the cooking medium for the particular application throughout the cooking process. Control over cooking medium flowrate and speed through the heat exchanger may also be conducted to achieve the desired cooking medium temperature.

It will be understood that the variables of flowrate, heat exchange element output and cooking medium pressure and flowrate may be varied to achieve varying heat transfer rate throughout the cooking process if this is desirable having regard to the nature of the cooking process and/or the nature of the food items being cooked.

The measured pressure may typically be a function of the degree of clogging of the filtration means and, even irrespective of pump characteristics, the filtration means may be operated to allow cleaning routines such as flushing or replacement if pressure sensed in the cooking medium delivery means falls below a predetermined value. These cleaning routines or replacement might also be indicated where pump impeller speed, increased to compensate for falling pressure in the delivery means, exceeds ac predetermined value. Other techniques for determining this point might be employed, for example optical or ultrasonic testing of clogging of the filter and so on.

The cooking apparatus may include means for measuring the energy absorbed by the food items during cooking. Thus, for example, temperature sensing means for sensing cooking medium temperature may be arranged such that temperature differential between delivered and removed cooking medium may be determined and used in calculation of absorbed energy as above described.

The method and apparatus of the above aspects of the invention may conveniently be supervised by a control unit for the cooking apparatus which implements desired temperature, flow and heat transfer rate control; and/or filtration means operation. The control may be made with reference to the nature of the food items being cooked, the cooking medium, the desires of the consumer for particular food products at various locations in which cooking apparatus operated in accordance with the method of the invention is located. The control unit may be electronic and used for calculating temperature differential and maintaining it within desired limits. The method may also be used with cooking apparatus other than that of the second aspect of the invention.

BRIEF DESCRIPTION OF THE DRAWINGS

The various aspects of the present invention may be more fully understood from the following description of preferred embodiments thereof made with reference to the accompanying drawings in which.

DETAILED DESCRIPTION OF PREFERRED EMBODIMENTS OF THE INVENTION

Figure 1:
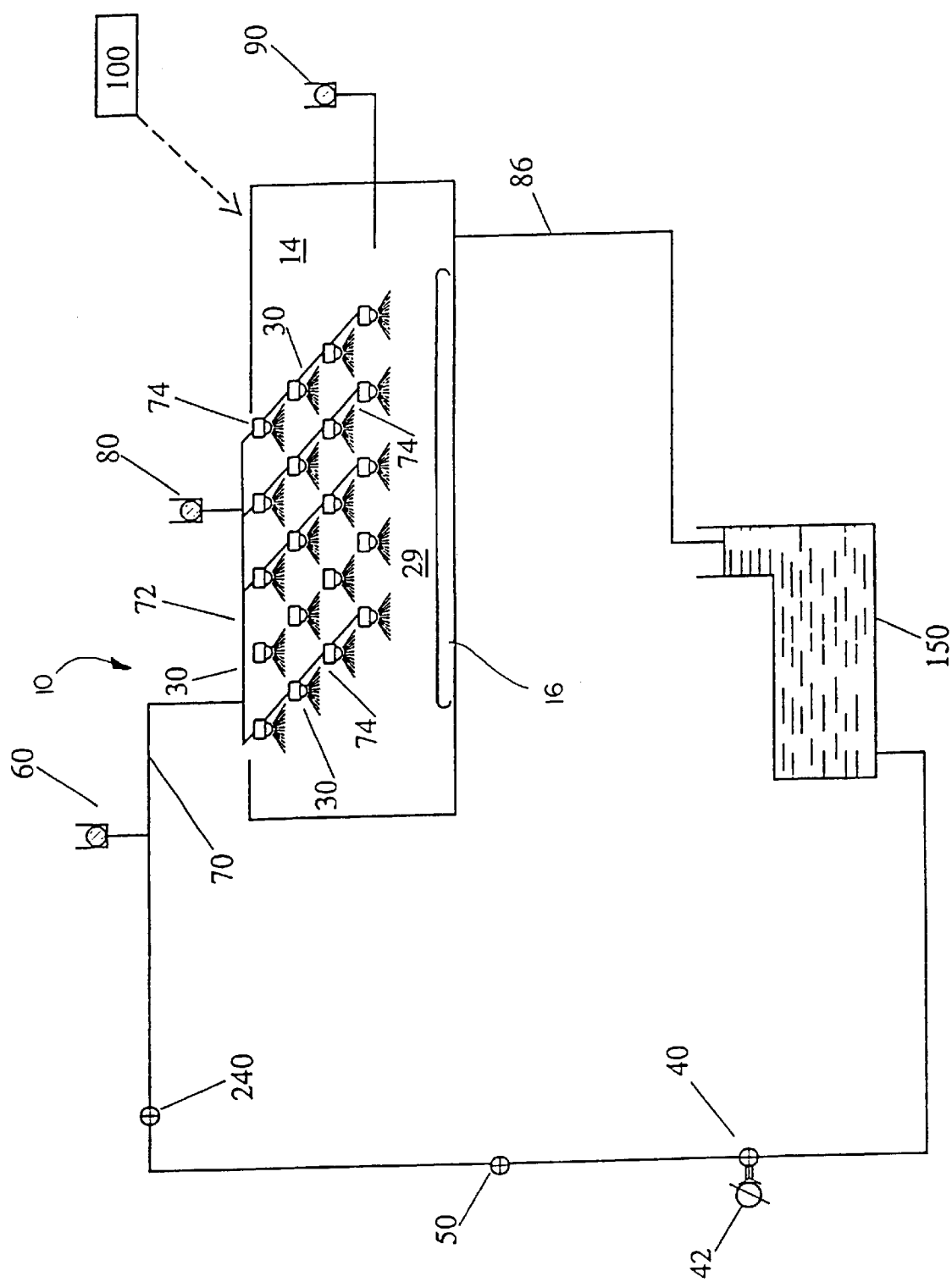
FIG. 1 is a process flow control diagram of a spray fryer made and operated in accordance with one embodiment of the invention.

Referring now to the drawings as a whole, the essential components of cooking apparatus made and operated in accordance with the present invention are the cooking apparatus containing the cooking zone or chamber in which food products are to be cooked, a fluid handling system or conditioning system that heats, filters and pumps or delivers cooking medium as required to the cooking zone(s) or chamber(s) and a supervising control unit and control system which can implement the method. The cooking apparatus may be of generally conventional type in terms of appearance, cooking zone design and adaptation to various kinds of cooking medium. It is in the fluid handling system and the control unit and control system that there are significant departures from conventional design. Yet once such modifications have been made it is possible to retrofit cooking apparatus of otherwise conventional design, whether of batch or continuous nature, basket or conveyor so as to operate in accordance with the method of the invention.

Referring now to FIG. 1, there is shown the process flow and control diagram of a spray cooking apparatus comprising an array 29 of sprayers 30, which for purposes of illustration are arranged above a conveyor 16 of endless mesh belt type. It could also be an angled tumbling cylinder or other means conveying food items through a cooking zone constituted by cooking chamber 14. Thus the cooking apparatus is arranged in continuous mode. It could be arranged in batch mode with food holding means such as static or rotating baskets, trays and the like. Sprayers 30 spray heated cooking medium onto food items passing though the cooking zone by conveyor in order to cook them. The cooking medium of preference may be an oil or fat such that the cooking apparatus is a fryer. Nevertheless, other cooking media (with the exception of deliberately delivered air) could be used and the apparatus could be employed to perform a number of cooking operations. The cooking apparatus and the components that will be described hereinbelow are supervised by control unit 100, which is preferably a programmable logic electronic control unit (ECU). As much as practicable of the operations of the spray fryer is automatically controlled. Manual adjustments are to be maintained at a minimum to enhance food item quality unless safety or like considerations dictate a manual override mode to be used.

The cooking medium is conditioned in the following manner. Cooking medium is drawn from main tank 150 which receives excess cooking medium sprayed through sprayers 30; and is otherwise connected to a cooking medium supply to ensure that the required volume of cooking medium is available within the system. The conditioning system also treats fresh cooking medium on start up and in the latter case. Excess cooking medium recovery through pipe 86 to main tank 150 may be facilitated by appropriate design of the floor of the cooking chamber 14 and, where appropriate, the conveyor 16. A main tank level control system may be used to control the supply as indicated in co-pending International Patent Application No. PCT/AU99/00073, filed 4th Feb., 1999, the contents of which are hereby incorporated herein by reference. The cooking medium is drawn from the main tank 150 by the operation of centrifugal pump 40 which is driven by a variable speed motor 42. The pump 40 may be sourced conventionally (trade name?) and is selected to operate to deliver desired flowrates and speeds of cooking medium over a range of pressure which is relevant as described below. Impeller speed may be controlled to achieve this object by control unit 100.

The pump 40 may be a single pump but may be considered as a pump module having a number of pumps 40 connected as desired.

The pump 40 delivers cooking medium to filtration unit 50 which is a filter of any desired type for removing substantially all food particles and other solid matter prior to delivery to heat exchanger 240. In this respect, the filtration unit 50 has the function of preventing build-up of an amount of solid particles such that formation of scale in pipes of the heat exchanger, carbonisation, blockage of sprayer nozzles may be avoided. It is also important that these factors are, to the maximum possible extent, prevented from adversely impinging on food quality by way of discolouration or otherwise.

The filtration unit 50 may have a number of filters arranged in parallel, any of which may be maintained offline until the working filter requires cleaning or replacement. The offline filter(s) are then enabled. The filtration unit may be arranged to allow cake removal, back flushing and other forms of cleaning. Bypass valves may be provided to facilitate cleaning. Provision may be made for drainage of cooking medium from the filtration unit 50 to facilitate cleaning. Separate pressure monitoring of clogging at the filtration unit 50 may be provided for. The filters should not be exposed to air during operation to prevent oil degradation.

The heat exchanger 240 may likewise include a module of heat exchangers arranged in series or parallel and having any desired means of interconnection between them. Particularly preferably and advantageously, the heat exchanger(s) 240 are of flow heater type allowing heating of cooking medium in the substantial absence of air or other oxidising or degrading agents. The advantages of flow heaters are described in our Australian Patent No. 666944, the contents of which are hereby incorporated, herein by reference. A particularly preferred heat exchanger has the design described in our co-pending International Patent Application No. PCT/AU98/00552 filed 17th Jul., 1998, the contents of which are likewise hereby incorporated herein by reference.

The heat exchanger(s) 240 may supply heat to cooking medium in any desired manner and may be gas,electrical or otherwise. An electrical heater will have the heat output of the electrical heater element(s) controlled to allow heating that takes account of the nature of the cooking medium and, in particular selected to avoid degradation thereof. The heat output is controlled ultimately by control unit 100 such that the temperature of the cooking medium is delivered to cooking chamber 14 at the desired temperature. The desired temperature is a setpoint pre-determined for the cooking process. PID control over temperature is advantageous, pulse width modulation of the heating element output being preferably used as described in International Patent Application No. PCT/AU98/00552 referred to above. Control over the heating element may also be adaptive control as described more fully below.

Reflecting the importance of the cooking medium temperature to the implementation of the desired control over the cooking process, there is a temperature probe 60 located at the outlet of the heat exchanger module 240 in delivery pipe 70. The temperature probe 60 may be of conventional type but a particularly preferred type is an NTC thermistor. The temperature sensed by the probe 60 is used to control the heat output of the heat exchanger element(s) to achieve the desired setpoint temperature. Heat output varies with cooking apparatus capacity. Alarm conditions may be indicated and remedial action taken as necessary if sensed temperature at probe 60 is outside predetermined temperature HIGH and temperature LOW limits.

The temperature sensed at temperature probe 60 may be used with that sensed at temperature probe 87, in excess cooking medium pipe 86, desirably of the same kind as temperature probe 60, in the control of the operation of the fryer will be described in further detail below.

Delivery pipe 70 delivers to pressure balance pipe 72 which delivers to a number of supply pipes 74 having sprayers 30 located along their length. The sprayers 30 have nozzles of the desired type and may be selected as appropriate given the position in the cooking chamber 14 to assure desired flow distribution or delivery pressure perhaps in accordance with cooking process nature (to allow, for example, searing followed by slower cooking). This requires a process of empirical observation for various food items and cooking processes which serve as basis for appropriate design and control of the fryer.

A pressure transducer 80 is located in pressure balance pipe 72. Generally, as fryer operation proceeds, the filter(s) 50 will occlude or clog and the pressure in balance pipe 72 will decrease. The decreasing pressure signal may be monitored by control unit 100 and compensated for by increase of the impeller speed of pump 40. This ensures that the required cooking medium flowrate continues to be delivered to the sprayers 30 (or, depending on design, on any module of sprayers 30) and cooking chamber 14. In combination with careful control over the temperature of cooking medium delivered by controlled heat exchange in heat exchanger(s) 240, the desired control of temperature and convective heat transfer rate to food items being cooked in cooking chamber 14 is achieved.

The variable speed motor 42 of centrifugal pump 40 is desirably only be operated within certain speed limits and if sensed speed exceeds a safe speed an alarm condition may be indicated and the necessary remedial action taken. The safe speed may have two bands. If speed exceeds a set proportion of maximum pump rated speed, say 90%, filter cleaning or changeover may be enabled. If the speed is too close or exceeds maximum rated speed, the apparatus may be shut down. Alternatively, if the sensed impeller speed is less than a safe speed, a pump failure may be indicated and the necessary remedial action taken.

The pressure sensed by pressure transducer 80 may also be used in this way. So, for example, if sensed pressure falls below a predetermined value, the necessary filter 50 cleaning routines may be implemented accompanied by enablement of the stand-by filter(s) 50. Otherwise, the control unit 100 may flag a need for filter 50 replacement or off-line cleaning. Generally, if sensed pressure falls, pump 40 impeller speed will be increased to compensate and if it rises impeller speed will be reduced to compensate.

As a further safety precaution, also allowing cross-checking of the correct operation of temperature probe 60, there may be included in cooking chamber 14, especially when operated batch mode, at least one further temperature probe 90. Food item temperature may be sensed. The temperature sensed by probe 90 might not be used for control purposes but comparison with the temperature sensed by probe 60 may be used as a checking mechanism. If necessary, the control unit 100 could be programmed to allow control using the temperature sensed by probe 90 for a short period, as a kind of "limp-home" mode.

The control unit 100 facilitates the performance of the method and is programmed to achieve the desired cooking process. Therefore, different cook programs may be provided for different food items, temperature-time. profiles, multi-zone cooker control, cooking medium nature and physical properties and other parameters relevant to the cooker type and the particular cooking process and selected by the operator accordingly. The control unit 100 is also programmed to achieve closed loop control over the temperature differential sensed between temperature probes 60 and 87. This provides a measure of the heat absorbed by food items in the fryer 10 which is consequently also controlled. The control unit 100 is programmed with look-up maps programmed with setpoint temperature differential or energy absorption data for particular cooking medium, cooking medium flow rates, food item nature and throughput and/or heat exchanger heat output. The setpoint data may take the form of an allowable range for sensed temperature differential and may be determined by experiment taking into account food quality achieved for the various values of temperature differential.

If sensed temperature differential is outside predetermined limits, a control response may be initiated. The control response may take several forms. If the temperature differential differs from the setpoint range, this may indicate that there is a fault or problem with delivery of the desired heat energy to food items in fryer 10. It will be understood that, often, food items supplied to the fryer 10 will be frozen food items. Thus, excess cooking medium flowing into line 86 will show a significant temperature drop from the temperature sensed at temperature probe 60 for a given cooking medium flowrate reflecting thaw and water vapourisation (which control unit 100 allows for). The energy of the excess cooking medium in line 86 may thus be calculated and compared with the energy delivered in cooking medium to cooking chamber 14. The difference, when correction is made, for heat losses from the cooking chamber 14 (which may be minimised by insulation) is a value for energy absorbed by the food items.

If the measured value of energy absorbed is less than setpoint programmed into control unit 100, a number of forms of corrective action may be enabled.

In a first control response, the flowrate of cooking medium may be increased. This increases the heat input to the cooking chamber 14 and, if energy absorbed by food items recovers to the desired level the flowrate of cooking medium may be maintained at the corrected value. In the system shown, cooking medium flowrate may be increased by increasing the speed of the variable speed motor 42 of pump 40. Heat output of the heat exchanger(s) 240 may likewise be increased to heat the increased volume of cooking medium to the desired level as necessary.

By contrast, if the energy absorption value is greater than setpoint, the cooking medium flowrate may be reduced, and/or the heat output of the heat exchanger(s) 240 may be reduced.

In a special case, the control unit 100 may be programmed such that, when the delivery of food items to the cooking chamber 14 ceases, for example when operation of the fryer 10 is in "stand-by" mode, delivery of cooking medium may be stopped. The cooking medium may simply be recirculated, without delivery to sprayers 30, during "stand-by" mode or cooking medium simply stored in main tank 150.

A second possible control response, particularly where the energy absorbed by food item is less than that desired, is to increase the heat output at the heat exchanger(s) 240 at the same flowrate of cooking medium. Such a control response is less preferred since overheating of oil is not desirable due to the risk of detrimental effect on oil quality. A less compromised response may involve small adjustments to the cooking medium flowrate by increasing the speed of the variable speed motor 42 and the delivery rate of centrifugal pump 40.

In a third possible control response, the cooking duration may be increased, for example by slowing the speed of the conveyor of food items. For a given cooking medium flowrate, the time of exposure of food items to cooking medium is increased. Accordingly, the energy absorbed by the food items should likewise increase. Equally, cooking duration may be reduced by increasing the throughput of food items, for example by increasing conveyor speed.

The control responses described may be used in any combination. This gives maximum flexibility in control response to variation in energy absorption of food items from the setpoint dictated by control unit 100.

The control unit 100 may programmed in a diagnostic mode. In such mode, the control until 100 may use energy absorption as a means of detecting abnormal operation, for example, failure or blockage of cooking medium delivery means, in this case sprayers 30. That is, if sprayer 30 nozzles block, an unevenness of heating may result and this may lead, as a consequence, to lower levels of energy absorption by food items. thus, if the delivery rate of cooking medium, heat exchanger heat output and delivery temperature and the food throughput are as expected, but measured energy absorption is abnormal, the control unit 100 may flag a possible problem with sprayer 30 nozzle blockage. In any event, if energy absorption, as measured is outside predetermined limits, the control unit 100 may flag such condition and the operator of the fryer 10 may be notified accordingly by display and/or audible alarm.

In the above embodiment, preferred locations for temperature probes 60 and 87 have been suggested. However, the method may be utilised in some form even if energy delivered to cooking chamber 14 and energy exiting the cooking chamber 14 is measured in a different way. Flow measurement may also be desired for line 86 to achieve greater precision though allowance for cooking medium "hang up", if significant, could be otherwise provided for in calculations by ECU 100.

Figure 2:
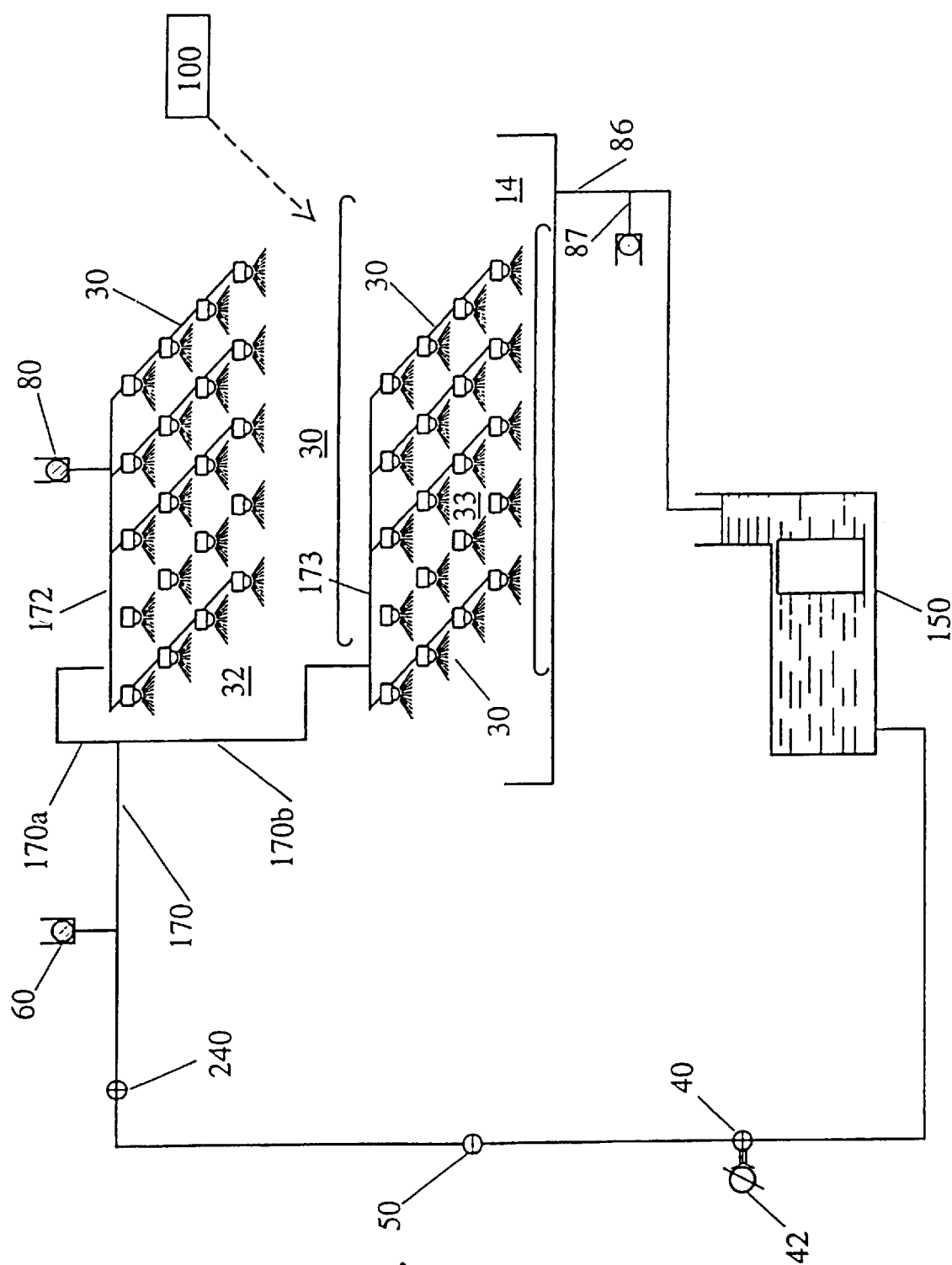
FIG. 2 is a process flow control diagram of a spray fryer made and operated in accordance with a further embodiment of the invention.

Referring now to FIG. 2, there is schematically shown a spray fryer having an upper array 32 of sprayers 30 and a lower array 33 of sprayers 30. Rather than each array 32 and 33 being supplied with cooking medium through dedicated fluid handling/conditioning systems provided for each array 32 and 33 (though this could be done), the fluid handling system may include, in sequence, a single pump module 40, a single filtration module 50 and a single heat exchange module 240. The control of the spray fryer will be conducted in much the same way as for the apparatus of FIG. 1 though the system may be made more flexible by provision of both sprayer arrays 32 and 33. Separate flow setpoints may be established for each array 32 and 33. Desired cooking and food quality with less reliance on tumbling mechanisms may be achieved by this kind of sprayer configuration. Top coated products may also be more efficiently handled.

In this spray fryer, substantial uniformity of pressure may be achieved in the pipes supplying each sprayer array by provision of appropriately sized pipes such that there is minimal variation in static pressure within the pipes. The pipes may be sized or provided with flow control means, including appropriate nozzles or control valves or otherwise to achieve different rates of cooking medium flow to each sprayer array 32 and 33. This may be desirable for top coated products where it may be desired to run at a lower supply pressure and/or with lower flow sprayer nozzles at the entry point or elsewhere, to avoid the coating being removed. Nozzle flow and/or pressure characteristic may be varied or selected for each cooking process, or during a cooking process, to achieve the same result or as desired bearing in mind, for example, food item nature. The nozzles may be changed in pressure or flow characteristic dependent upon the location in cooking chamber 14, so —for example —lower flow nozzles might be used in the entry portion of the cooking chamber and higher flow nozzles further along the cooking chamber 14. Ease of operation is gained by having all nozzles working at the same pressure. The nozzles may be threaded or provided with quick couplings to facilitate connection/disconnection in accordance with operational requirements or maintenance. Flow control means may be included in the cooking medium delivery means to allow variation in cooking medium delivery behaviour.

It will be understood that pressure transducer 80 located in balance pipe 172 could be the only transducer employed but, for additional safety or control, a pressure transducer could also be located in balance pipe 173 if desired. Heaters, even filters, could be arranged in both limbs 170a and 170b of delivery pipe 170 to achieve further heating flexibility for both arrays 32 and 33. Pipes 170a, 170b, 172 and 173 are all pressure balance pipes with large enough size as to have substantially the same static pressure along their length. Indeed, the sprayers 30 may be arranged in as many banks, delivering the same or different flowrates or temperatures of cooking medium, as desired. If this is done, further temperature probes may be included as necessary and probe 60 could be used for feed-forward control over temperature. Indeed, this is possible even in the more simple construction where the temperature probe could be located in advance of the heat exchanger module 240.

Similarly spray fryers of FIGS. 1 or 2 may be configured into multi-zone cooking mode and, as necessary, the cooking medium supply or delivery means for each zone may have their flow characteristics varied by control valves or pressure or flow restrictions to ensure that cooking medium delivery rate and pressure is controlled to achieve particular desired energy transfer rates to food items in each zone.

In this case, energy absorption may be calculated by control unit 100 on a zone basis for more efficient control. Flowrate and temperature may, particularly, be varied as necessary to respond to variation in measured energy absorption from setpoint. In such case, it may be difficult to vary cooking duration as a control response, particularly when the same conveyor passes through all zones. The control unit 100 may be programmed to achieve an appropriate response.

Figure 5:
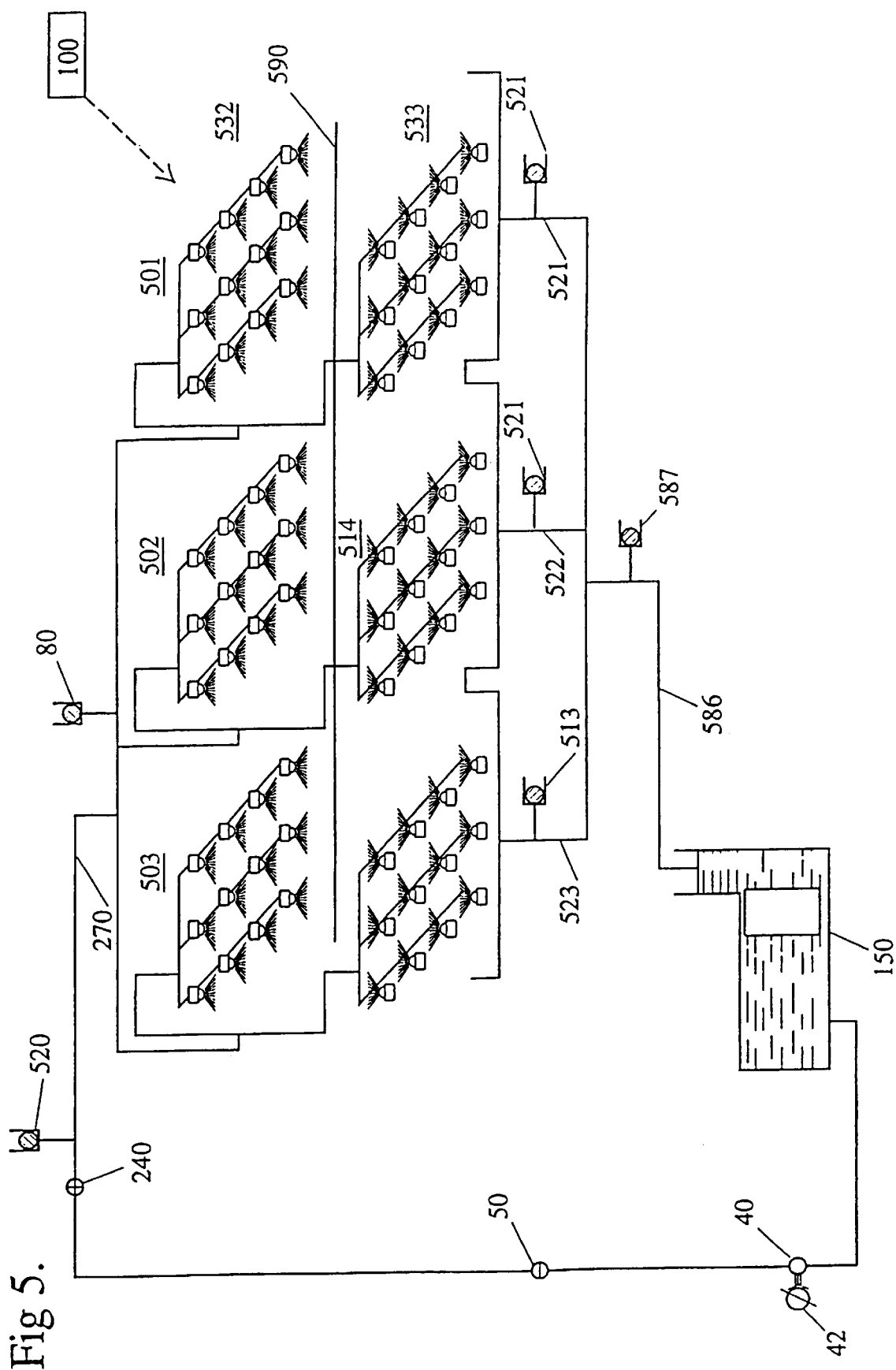
FIG. 5 is a process flow and control diagram of a multiple zone spray fryer made and operated in accordance with a fifth embodiment of the present invention.

Such a spray fryer is schematically illustrated in FIG. 5. In the spray fryer, there are illustrated three cooking zones 501, 502, 503. Of course, any number of cooking zones could be selected as desired. Each zone has cooking medium delivered to it by sprayer arrays 532 and 533 located above and below a conveyor 590 for conveying food items through the zones.

Excess cooking medium from each zone 501, 502 and 503 has temperature sensed by NTC thermistors 511, 512 and 513 located in branch lines 521, 522 and 523 recovering excess cooking medium from each zone. This is necessary in a spray fryer because sensing the temperature of the cooking chamber itself does not allow calculation of energy absorption as this temperature is almost equal to that for delivered cooking medium. The temperature of cooking medium delivered to each zone 501–503 is the temperature sensed by NTC thermistor 520. Thermistor 587 could be used to allow calculation of an energy balance or cross checking but may be omitted.

The control unit 100 may readily compute temperature differential for each zone and, accordingly, energy absorbed by food items in each zone 501–503 may be computed and the necessary control response, which may take the form described in relation to FIGS. 1 and 2, may be initiated in response to variation of energy absorption from setpoint range programmed into the control unit 100.

Although a single conveyor 590 is shown it is to be understood that each zone 501–503 may be provided with its own conveyor. This would enable cooking duration to be varied as a control response to variation of energy absorption from setpoint.

It also has operating advantages. If a light wire belt is to be used in order to allow the bottom sprayers to reach the food items on the belt it becomes more difficult to use a single belt conveyor running the entire length of the cooking chamber 514 at the same wire gauge because of load constraints. Basically, a heavier wire gauge would be required to achieve the requisite strength. A modular construction avoids this problem though the driving shafts of each belt may be synchronised and driven from the same motor unit by means of roller chains or similar devices. If each conveyor is provided with its own motor, each being under control of control unit 100, the speed of each conveyor for each zone 501 to 503 may be controlled to achieve the desired-residence time of food items in each of the cooking zones 501–503.

Figure 3:
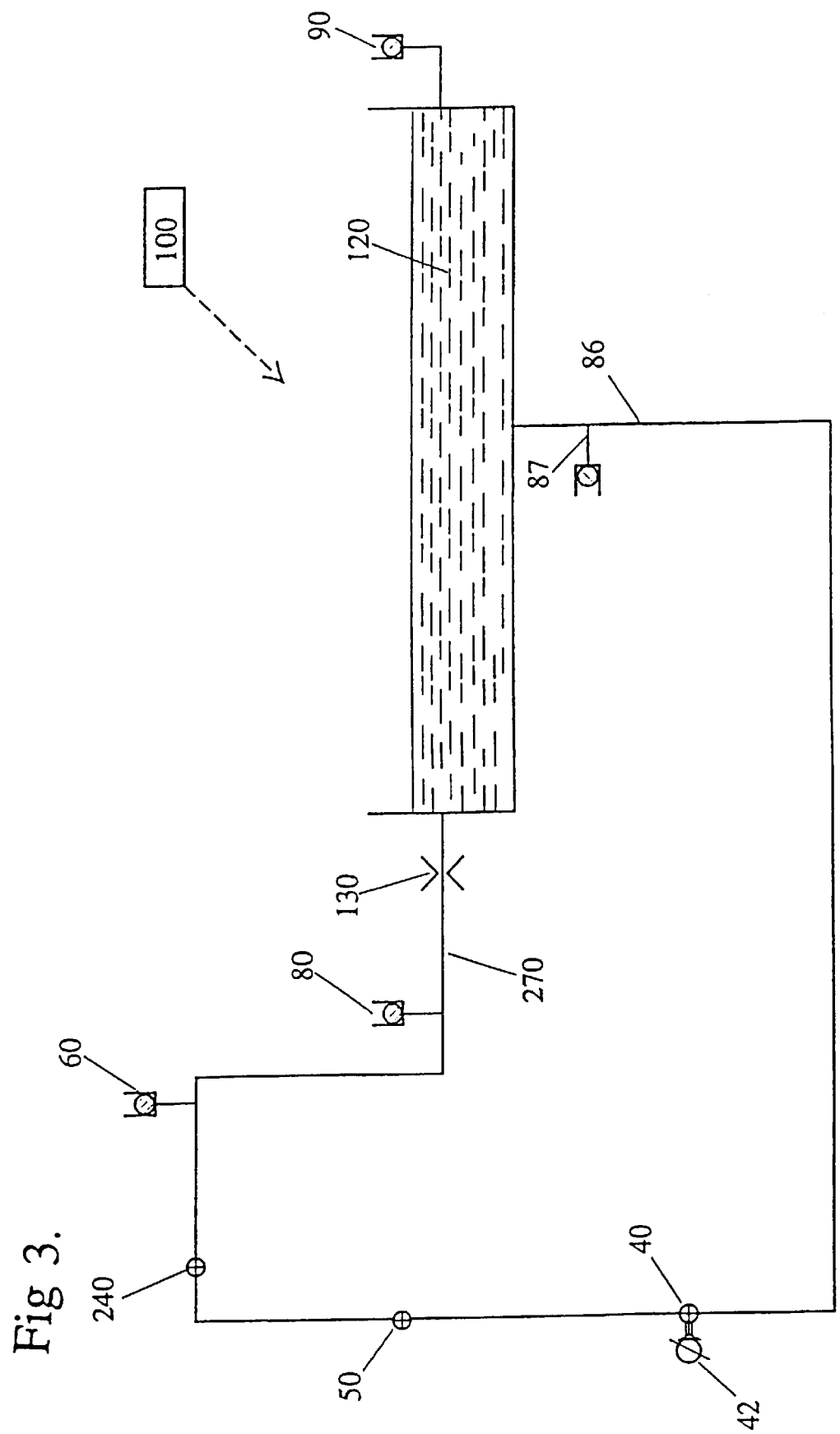
FIG. 3 is a process flow control diagram of a vat fryer made and operated in accordance with another embodiment of the invention.

Referring now to FIG. 3, there is shown a batch vat fryer of the kind typically found in fast food outlets. The vat fryer could be of continuous type. The same principles of operation apply as described in relation to the spray fryers of FIGS. 1 and 2 taking account of the following differences. Food items will be generally placed into a basket or like device and immersed in the vat 120 of hot oil. Possibly they may be shaken at times. Such shaking may facilitate convective heat transfer. Therefore it would be preferred to control or automate shaking, a sensed condition of the cooking zone, to gain more precise control over the cooking process. The basket may be suitably placed in a mechanical shaking device to achieve this result, the amplitude and duration of shaking being under the control of control unit 100.

Nevertheless, the major mechanism by which convective heat transfer will be achieved is by the flowrate of cooking medium past the food items in the basket. Therefore, the cooking medium delivery means need to be located proximate the basket to achieve this result. Further, it is preferred that plural delivery pipes are provided and the vat fryer may be operated in a cross-flow mode.

In-vat heating of cooking medium is desirably to be avoided though is not excluded. Therefore the cooking medium conditioning system, including the heat exchanger module 240, may advantageously be similar to that described for the spray fryer. Flow restrictions in the form of diaphragms, control valves or otherwise —including nozzles —are provided to achieve the desired cooking medium flow through the cooking medium delivery pipes. The diaphragms may be constituted by thin metal washers. Such a diaphragm 130 is shown located in a single delivery pipe 270 for the purposes of illustration. Pressure transducer 80 is used in control of pump 40 operation as above described. The combination of pressure transducer 80 and diaphragm 130 functions as a liquid flow meter and a means by which convection may be controlled. Dedicated flowmeters and control using valves and so on could be used.

In this case, similar control methodology may be employed as described in relation to FIGS. 1 and 2. The temperature is measured in the vat by NTC thermistor 90, the exit line 86 by NTC thermistor 87 and delivery pipe 270 by NTC thermistor 60. Thus, a measure of energy absorbed by food items in the vat fryer may be achieved either by using temperature differential between that in pipe 270 and (a) exit line 86 or (b) the vat itself. If vat temperature is used, it may be used alone omitting that of exit line 86 using the differential and flow overtime. Temperature probe 87 may be sensed for cross checking purposes. Variation from the setpoint energy absorption may be addressed in the same way as for FIGS. 1 and 2 with flowrate and heat exchanger heat output being the prime control variables.

Where food items are conveyed through the vat, cooking duration may be varied by control over the speed of the conveyor. If the baskets are employed, the-cooking time may be controlled and the operator advised accordingly by display and/or audible alarm.

Figure 4:
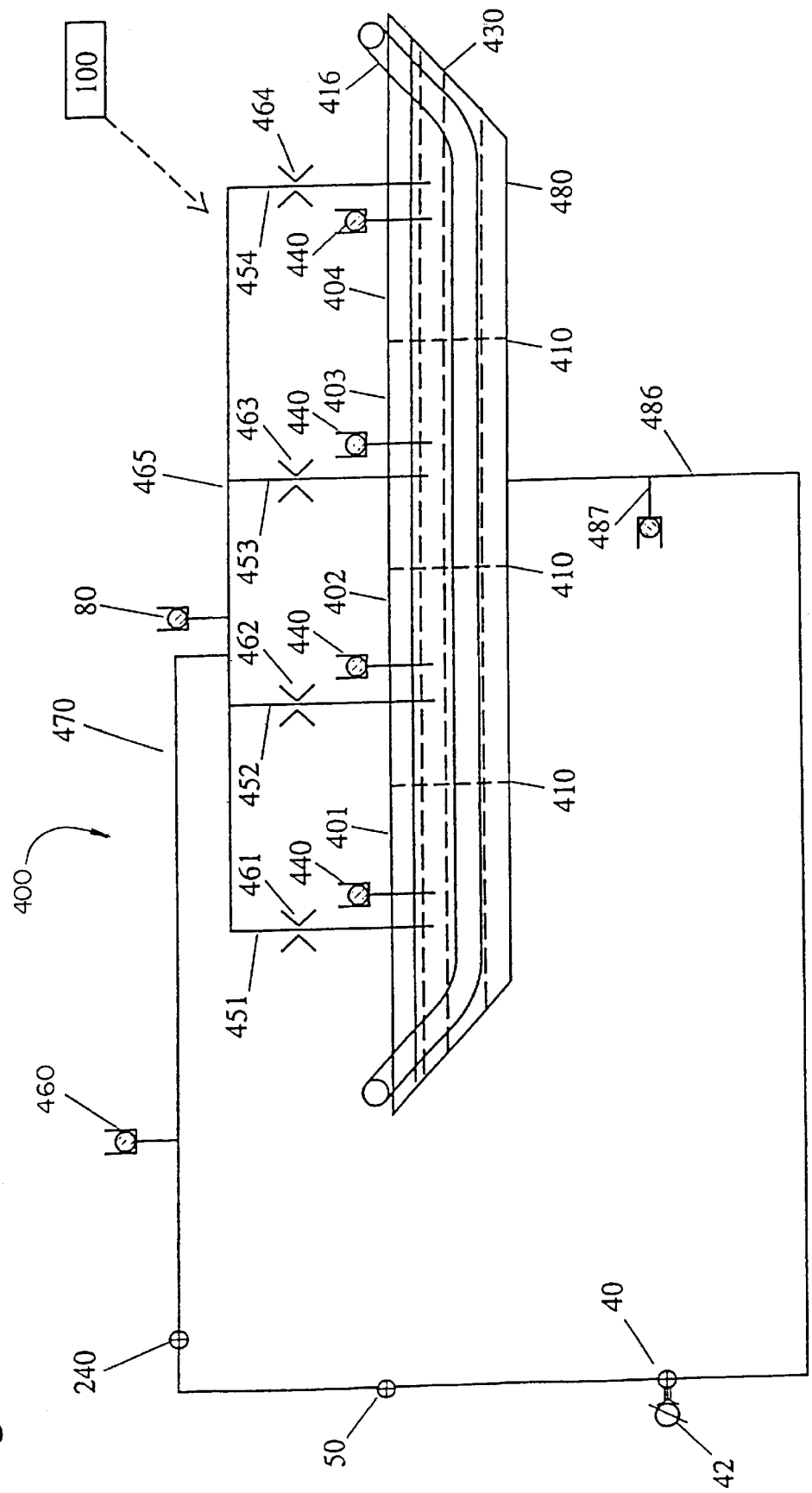
FIG. 4 is a process flow control diagram of a multiple zone vat fryer made and operated in accordance with a further embodiment of the invention.

Referring now to FIG. 4, there is shown a vat fryer 400 having a vat 480 with multiple cooking zones. There are four cooking zones 401, 402, 403 and 404 shown for the purposes of example, each being separated from the adjacent zone(s) by baffles 410 though liquid transfer between the zones is provided for to allow for level balance. Any desired number of zones could be provided for. Food items are conveyed through the four distinct cooking zones 401, 402, 403 and 404 of the vat fryer 400 by conveyor 430 with food items passing from left to right. Multiple conveyors or other continuous conveying means could be employed and driven at the same or different speeds to achieve the desired cooking duration. Batch operation is also possible.

Each zone is provided with a temperature probe 440 of conventional type, preferably of NTC type. Temperature probe 440 provides temperature data for control unit 100.

Cooking medium is supplied to zones 401, 402, 403 and 404 by supply pipes 451, 452, 453 and 454 constituting part of the cooking medium delivery means respectively. Pipes 451 to 454 are supplied by pressure balance pipe 465 in which is located pressure transducer 80 having same function as above described. Cooking medium pipes 451 to 454 are provided, near the point of delivery to each cooking zone, with diaphragms 461, 462, 463 and 464. The diaphragms may be arranged so that, at a given pressure drop, the flow rate sum through the multiple diaphragms equals the flowrate of the single diaphragm illustrated in FIG. 3. These diaphragms could be replaced by other pressure restrictions or control valves as desired. They may be made readily changeable.

Cooking medium is drawn from vat 480 by operation of variable speed centrifugal pump 40 through pipe 486 through the pump 40, through filtration module 50 and heat exchanger module 240. Following this, the cooking medium is conditioned to appropriate temperature, flowrate and solids content as dictated by the filtration unit 50 characteristics for supply back through pipe 470, pressure balance pipe 465 and cooking medium pipes 451 to 454 to the various zones 401, 402, 403, 404 of the vat 480 as above described.

There are plural possible modes of operation. Diaphragms 461 to 464 might be of equal size and consequently, the flowrate of cooking medium to each zone 401 to 404 would be the same. Then provided that the food item feed rate to the cooking apparatus 400 remains the same, there is a minimum total flowrate above which the temperature, as sensed by the individual temperature probe 440 located in each zone 401 to 404, is the same. The food item feed rate and particularly the duration for which food items remain in the cooking apparatus may be dictated by the speed of conveyor 430 which may also be under the control of the control unit 100. It will be understood that food item feed rate might be controlled by other means, for example food items may be stored in storage means provided with gate, star valves or other means that control the rate of feed of food items either directly or indirectly to conveyor .

Below this minimum flowrate, a temperature variation increasing from zone 401 to 404 would be established. Thus different temperature profiles across the zones might become a desired control parameter with small variations in product feed rate being compensated for through control over the total flowrate such that the desired temperature profile is maintained, particularly in commercial batch fryers.

The control unit 100 supervising the control over temperature profile may be programmed with look-up maps which may indicate alarm condition or out of order state condition if temperature probes 440 are reading abnormally, say values outside permissible bounds of the set point temperature for each zone 401 to 404. Similar response may be provided where the temperature profile across the cooking apparatus 400 is outside the permissible bounds. Pump 40 operation may be similarly monitored and controlled as described above with reference to the spray fryers. Desired limits and correlation rules may be programmed into the control unit 100 to achieve this object. The temperature sensed by the temperature probe 460 located after the heat exchanger module 240 may also be monitored in the same way. Discrepancy between this value and those sensed by the temperature probes 440 in each zone 401 to 404 of the cooking apparatus 400 may also be compensated for as appropriate.

The control unit 100 correlation rules and limits may be such as to allow cross checking of correct operation of the temperature probes. That is, if the temperature sensed by one or more zones is inconsistent with product feed rate and/or heat exchanger heat input rate and/or total cooking medium flow or flow to each zone 401 to 404, the ECU 100 may indicate that temperature probe(s) 440 are not operating correctly and that servicing or replacement is required.

Control unit 100 functions, as for the apparatus shown in FIGS. 1 to 3 and 5, to control the amount of energy absorbed by food items. Being a multi-zone fryer, control is best addressed on a zone basis with control response being as previously described. As flow characteristics to each zone are identified as above described a measure for energy absorbed in each zone may be computed by the control unit 100 using a temperature probe 487 in line 486 and performing an energy balance. However, the cooking apparatus 400 may be designed with an exit main to which excess cooking medium from each of the zones 401–404 is delivered. A branch pipe connects each zone to the exit main and a temperature probe could be located in each branch pipe so that energy absorbed for each zone may be specifically measured. A control response may then be initiated by variation of cooking medium flow to each one. Cooking duration in each zone may be controlled as a response to error in energy absorption by controlling conveyor speed where separate conveyors are provided for each zone 401 to 404.

In an alternative embodiment, it may be possible to employ the temperature profile across zones 401–404 to identify problems with energy absorption by food items. Thus, if the profile varies from that programmed into control unit 100, a control response may be initiated to correct the temperature profile.

Pressure transducer 80 measures the pressure in the balance pipe. The speed of centrifugal pump 40 may be varied by variable speed motor 42 where the pressure varies to maintain desired flowrate. If the pressure falls below an allowable level and/or pump speed increases above a set level, the control unit 100 may indicate that filtration units 50 require cleaning or replacement. A cleaning routine may be implemented automatically as above described. If the pump speed exceeds a safe level, shut-down may be implemented.

Another operating mode envisages diaphragms 461 to 464 being of different sizes such that desired proportioning of cooking medium flowrate to each zone 401 to 404 may be achieved. This also could be achieved by the diaphragms being replaced by flow control valves ensuring that the desired proportioning is achieved. It will be understood that such proportioning may be controlled such that equal cooking medium flowrate occurs to each zone, thus also covering the first operating mode described above.

This operating mode is particularly suited to the nature of the typical cooking process where most energy is consumed in vapourisation of water at the beginning of the cooking process when food items, especially frozen food items, are delivered to the cooking zone of the cooking apparatus. In such cases, during a substantial portion, up to 75% of the cooking time there is very little fat intake into the food items due to intense flow of water coming out of the food items. In such cases, it follows that a relatively high amount of energy is needed at the beginning of the cooking process and a relatively small amount towards the end of the cooking process. ECU 100 will allow for this.

Constant temperature cooking may be achieved by selecting the size of the diaphragms so the ratio of desired energy transfer rate between zones, as desired for example in the case of a cooking process of the above described type is matched by the ratio of liquid flow through the diaphragms.

It will be understood that variations in product quantity input to the cooking apparatus cause variations in heat energy requirements. Substantially constant temperature in all zones may be maintained by appropriate variation of the total cooking medium flowrate with product quantity input. The cooking medium requirement may then be optimised as only that flowrate desired to achieve cooking at the desired heat transfer rate and temperature will be required. Consequential reduction in cooking medium total flow rate allows a smaller fluid handling system, lower filtration area and a smaller cross sectional area of flow path through the heat exchange module.

The diaphragm(s) 461 to 464 of vat cooking apparatus may be changed in size as necessary so that the desired heat exchanger output temperature and total flowrate, desired temperature and energy transfer rate may be achieved for each zone 401 to 404. By analogy, the same methodology may be applied to a single zone cooking apparatus.

In single vat batch cooking, constant temperature may be achieved by variation of cooking medium flowrate through the vat 480 during the cooking time. The advantage of better food product quality and consistency in terms of colour, texture, taste and oil content (where the cooking medium is oleaginous) may thereby be achieved while allowing the food technologist flexibility in adapting the cooking process as required to various kinds of food item.

Modifications and variations to the cooking apparatus and control methods of the invention may be made by the skilled reader on consideration of the disclosure. Such modifications and variations are intended to be within the scope of the present invention. In particular, the mechanisms of enhancing convective heat transfer described herein are not intended to be limiting and other mechanisms could be used in place of, or in addition to, those described. For example, in the vat fryer case, mechanisms to agitate the cooking medium in the vat other than design over the cooking medium delivery pipes could be included. The cooking medium might be selected having regard to its physical nature such as to be a medium more conducive to convective heat transfer to food items, thus the thermal conductivity, the viscosity-temperature and/or density-temperature profile of the cooking medium may be considered with a view to selecting the most appropriate cooking medium. Any kind of cooking apparatus may be controlled by the method of the present invention. For example, the cooking apparatus disclosed in Australian Provisional Patent Application No. PP5623, filed 1st Sep., 1998; and Australian Provisional Patent Application No. PP5622, filed 1st Sep., 1998, the contents of which are hereby incorporated herein by reference may also be operated in accordance with the disclosed control method.

The claims defining the invention are as follows:

1. A method of at least partially cooking food items by exposing them to a heated liquid cooking medium supplied by cooking medium delivery means to a cooking zone of a cooker including a control unit which, during a cooking process:
   (a) controls the temperature of the cooking medium delivered to the cooking zone to a pre-determined setpoint specific for the food items by controlling heat output from a heat exchanger for heating cooking medium throughout the cooking process;
   (b) controls the rate of convective heat transfer to the food items by directly controlling a sensed condition of cooking medium delivered to the cooking zone, other than temperature which is controlled in step (a), related to the rate of convective heat transfer; and, optionally,
   (c) controls the rate of convective heat transfer to the food items by controlling a sensed condition of the cooking zone related to the rate of convective heat transfer.

2. The method of claim 1 wherein energy absorbed by the food items is measured and used for cooker control in accordance with at least one of steps (a) to (c).

3. The method of claim 1 wherein, in step (b), said sensed condition: of cooking medium delivered to the cooking zone is one or more of the following: cooking medium delivery pressure, cooking medium flowrate, cooking medium density, cooking medium viscosity and cooking medium turbulence; and, where step (c) is employed, said sensed condition of the cooking zone is one or more of the following: sprayer type, nozzle type, hydraulic restriction type, turbulence in the cooking zone, cooking zone temperature, cooking duration and basket shaking frequency.

4. The method of claim 1 wherein the cooker has multiple cooking zones having cooking medium delivered to each by cooking medium delivery means.

5. The method of claim 4 wherein at least one variable related to convective heat transfer is controlled for each cooking zone for achieving a desired energy profile across the multiple cooking zones.

6. The method of claim 4 wherein temperature is controlled for each cooking zone for achieving a desired temperature profile across the multiple cooking zones.

7. The method of claim 2 wherein the temperature differential between delivered and removed cooking medium is sensed and used for cooker control in accordance with at least one of step (a) and step (b).

8. The method of claim 4 wherein said cooking medium delivery means includes at least one of sprayer nozzles and flow restrictions.

9. The method of claim 8 wherein the cooking medium delivery means is controlled for cooking process control in accordance with at least one of step (a) and step (b).

10. The method of claim 1 wherein temperature and convective heat transfer rates are controlled to be time variant throughout a cooking process.

11. The method of claim 1 wherein temperature and convective heat transfer rates are controlled to be constant throughout a cooking process.

12. The method of claim 1 wherein said cooking medium is an oil or fat and heating of the cooking medium is conducted outside the cooking zone in the substantial absence of air.

13. The method of claim 1 wherein the cooker is a vat fryer.

14. The method of claim 1 wherein the cooker is a spray fryer.

15. The method of claim 7 wherein said control unit is programmed with setpoint temperature differential data for particular cooking processes.

16. The method of claim 15 wherein said setpoint temperature differential is a function of one or more of: cooking duration, cooking medium flowrate, food item nature and food item throughput.

17. The method of claim 2 wherein energy absorption is measured for detecting abnormal operation of said cooking medium delivery means.

* * * * *